United States Patent
Harris et al.

(10) Patent No.: US 7,701,943 B2
(45) Date of Patent: Apr. 20, 2010

(54) SLAVE NODE AND LOCAL INTERCONNECT NETWORK (LIN NETWORK) HAVING SAME

(75) Inventors: Dale M. Harris, Boardman, OH (US); Terry L. Hanna, Orlando, FL (US); James W. Streit, Simpsonville, SC (US)

(73) Assignee: Delphi Technologies, Inc., Troy, MI (US)

(*) Notice: Subject to any disclaimer, the term of this patent is extended or adjusted under 35 U.S.C. 154(b) by 1267 days.

(21) Appl. No.: 11/073,832

(22) Filed: Mar. 7, 2005

(65) Prior Publication Data
US 2005/0265344 A1  Dec. 1, 2005

Related U.S. Application Data

(60) Provisional application No. 60/567,481, filed on May 3, 2004.

(51) Int. Cl.
*H04L 12/28* (2006.01)
(52) U.S. Cl. ........................... 370/392; 370/509
(58) Field of Classification Search ................. None
See application file for complete search history.

(56) References Cited

U.S. PATENT DOCUMENTS

| | | | | |
|---|---|---|---|---|
| 6,389,337 | B1* | 5/2002 | Kolls | 701/29 |
| 6,420,975 | B1* | 7/2002 | DeLine et al. | 340/815.4 |
| 6,422,062 | B1 | 7/2002 | King et al. | |
| 6,853,894 | B1* | 2/2005 | Kolls | 701/29 |
| 6,871,250 | B2* | 3/2005 | Froeschl et al. | 710/110 |
| 6,895,310 | B1* | 5/2005 | Kolls | 701/1 |
| 2002/0101884 | A1 | 8/2002 | Pohlmeyer et al. | |
| 2004/0246997 | A1* | 12/2004 | Ruat et al. | 370/509 |
| 2006/0120390 | A1* | 6/2006 | Habben et al. | 370/406 |
| 2007/0047450 | A1* | 3/2007 | Prasanna | 370/241 |
| 2008/0219274 | A1* | 9/2008 | Kato et al. | 370/401 |
| 2008/0304499 | A1* | 12/2008 | Jeon et al. | 370/401 |

OTHER PUBLICATIONS

Navet, N. Song, Y. Simonot-Lion, F. Wilwert, C., Trends in Automotive Communication Systems, Jun. 2005, IEEE, Proceedings of the IEEE, vol. 93, Issue: 6, pp. 1204-1223.*

Cervi, M. Pappis, D. Marchesan, T.B. Campos, A. do Prado, R.N., A semiconductor lighting system controlled through a LIN network to automotive application, Oct. 2, 2005, IEEE, Conference Record of the 2005 Industry Applications Conference, vol. 3, pp. 1603-1608.*

(Continued)

*Primary Examiner*—Jayanti K Patel
*Assistant Examiner*—Hooman Houshmand
(74) *Attorney, Agent, or Firm*—Thomas N. Twomey

(57) ABSTRACT

A slave node for use with a Local Interconnect Network (LIN network) receives incoming messages from the LIN network in a manner that reduces operating current, power consumption and/or operating temperature. The slave node generally includes an input circuit, an electronic processing device, associated components such as an Integrated Glass Fog Sensor (IGFS) unit, and a transmitting device all mounted on a single circuit board. The input circuit, which can either be separate from or incorporated within the electronic processing device, pre-filters an incoming message from a LIN bus such that it only wakes the transmitting device out of its low-current sleep mode when required. Stated differently, the transmitting device is removed from an incoming message path so that it is only active when it is transmitting an outgoing message.

15 Claims, 2 Drawing Sheets

OTHER PUBLICATIONS

Gabriel, C. Horia, H., Integrating sensor devices in a LIN bus network, May 8, 2003, IEEE, 26th International Spring Seminar on Electronics Technology: Integrated Management of Electronic Materials Production, 2003, pp. 150-153.*

Microchip: "MCP201 LIN Transceiver with Voltage Regulator" Datasheet, [Online] Mar. 25, 2003, pp. 1-26.

European Search Report dated Aug. 13, 2007.

* cited by examiner

SLAVE NODE AND LOCAL INTERCONNECT NETWORK (LIN NETWORK) HAVING SAME

RELATED APPLICATIONS

This application claims benefit of U.S. Provisional Patent Application No. 60/567,481 filed May 3, 2004.

FIELD OF THE INVENTION

This invention relates generally to a Local Interconnect Network (hereafter referred to as a 'LIN network'), and more specifically, to a LIN network having a slave node that is designed to reduce operating current, power consumption and/or operating temperature.

BACKGROUND OF THE INVENTION

A LIN network is a single-wire serial communications protocol that is used in a number of industries, including the automotive industry. Reasons for its widespread use in the automotive industry include its scalability and its cost efficiency, the latter of which is at least partially attributed to the simplicity of Universal Asynchronous Receiver/Transmitter (UART) communication and the low cost of using a single-wire medium.

In general, a single LIN network usually includes a number of "slave nodes" that are periodically and/or intermittently addressed by a "master node." For example, a LIN network may include a single master node and up to sixteen separate slave nodes, and the slave nodes can be addressed by the master node at any given time and in a manner that requires no arbitration or collision management in the slave node itself. In such LIN networks, particularly where the number of slave nodes is large, current draw in each of the slave nodes can be a concern. This is particularly true in instances where it is an objective to reduce the power consumption and/or operating temperature in the individual slave nodes. In such situations, a combination of hardware and/or software techniques may be implemented to address the current draw issue, which in turn can affect power consumption and operating temperature.

In temperature and/or current sensitive applications, implementing a LIN network can present challenges due to the relatively high current draw of the slave nodes, and more specifically, of the LIN transceivers which are components of the slave nodes. According to the prior art circuit shown in FIG. 1, a typical LIN slave node 10 is connected to a LIN bus 12 and includes LIN transceiver 20, a microcontroller 22, and one or more additional component(s) 24 such as a sensor unit. The LIN transceiver 20 pre-filters and buffers all incoming signals from LIN bus 12, which causes the LIN transceiver to come out of a sleep mode every time there is a request or command placed on the LIN bus, even when it pertains to an entirely different slave node. Because LIN transceiver 20 is not a low current device, this can have a detrimental effect on the overall current being drawn by slave node 10. In certain temperature and/or current sensitive applications, the increased current draw caused by LIN transceiver 20 waking up each time a request is put on LIN bus 12 is undesirable.

An example of such a temperature and/or current sensitive application is disclosed in U.S. Pat. No. 6,422,062, which is assigned to the present assignee and is hereby incorporated by reference. This patent discloses an Integrated Glass Fog Sensor unit (hereafter referred to as an 'IGFS unit'), and is the type of sensor that could be used as sensor unit 24 in FIG. 1. Of course, the IGFS unit taught in the '062 patent is strictly being provided for exemplary purposes, as a number of other sensors and/or components could also be used in LIN slave node 10. The IGFS unit of this patent has a glass surface temperature sensor, an ambient air temperature sensor and a relative humidity sensor, and is used for predicting glass fog formation on a vehicle windshield.

Thus, it would be advantageous to provide a slave node for use in a LIN network where the slave node has a reduced operating current, power consumption and/or operating temperature. It is also desirable to provide a slave node for use with temperature and/or current sensitive applications such as, but not limited to, an IGFS unit.

SUMMARY OF THE INVENTION

According to one embodiment of the invention, there is provided a slave node for use in a LIN network that comprises an input circuit, an electronic processing device, and a transmitting device. The input circuit receives an incoming message from the LIN network, the electronic processing device interprets the incoming message and/or compiles an outgoing message, and the transmitting device transmits the outgoing message to the LIN network, if required. The input circuit is separate from the transmitting device, such that the transmitting device is generally inactive during reception of the incoming message.

According to another embodiment of the invention, there is provided a slave node for use in a LIN network that comprises a level-shift circuit, a ground-shift circuit, a wave-shaping circuit, an electronic processing device, and a transmitting device. At least one of the level-shift, ground-shift and wave-shaping circuits is integrated into the electronic processing device.

According to yet another embodiment, there is provided a Local Interconnect Network (LIN network) that comprises a LIN bus, a master node, and a slave node, which further comprises a level-shift circuit, a ground-shift circuit, a comparator, an electronic processing device and a transmitting device. The electronic processing device interprets the incoming message and only wakes up the transmitting device when it is needed to transmit the outgoing message.

Certain objects, features and advantages of this invention include, but are certainly not limited to, providing a LIN slave node that reduces operating current, power consumption and/or operating temperature, providing a LIN slave node that reduces packaging size so that it can be integrated on a single circuit board with associated components, such as an integrated glass fog sensor (IGFS) unit, and providing a LIN slave node where an input circuit and/or a microcontroller pre-filter incoming messages and wake up a transceiver only when required.

BRIEF DESCRIPTION OF THE DRAWINGS

The preferred embodiment(s) of the invention are disclosed in the following description and in the accompanying drawings, wherein.

DETAILED DESCRIPTION OF A PREFERRED EMBODIMENT(S)

Figure 2:
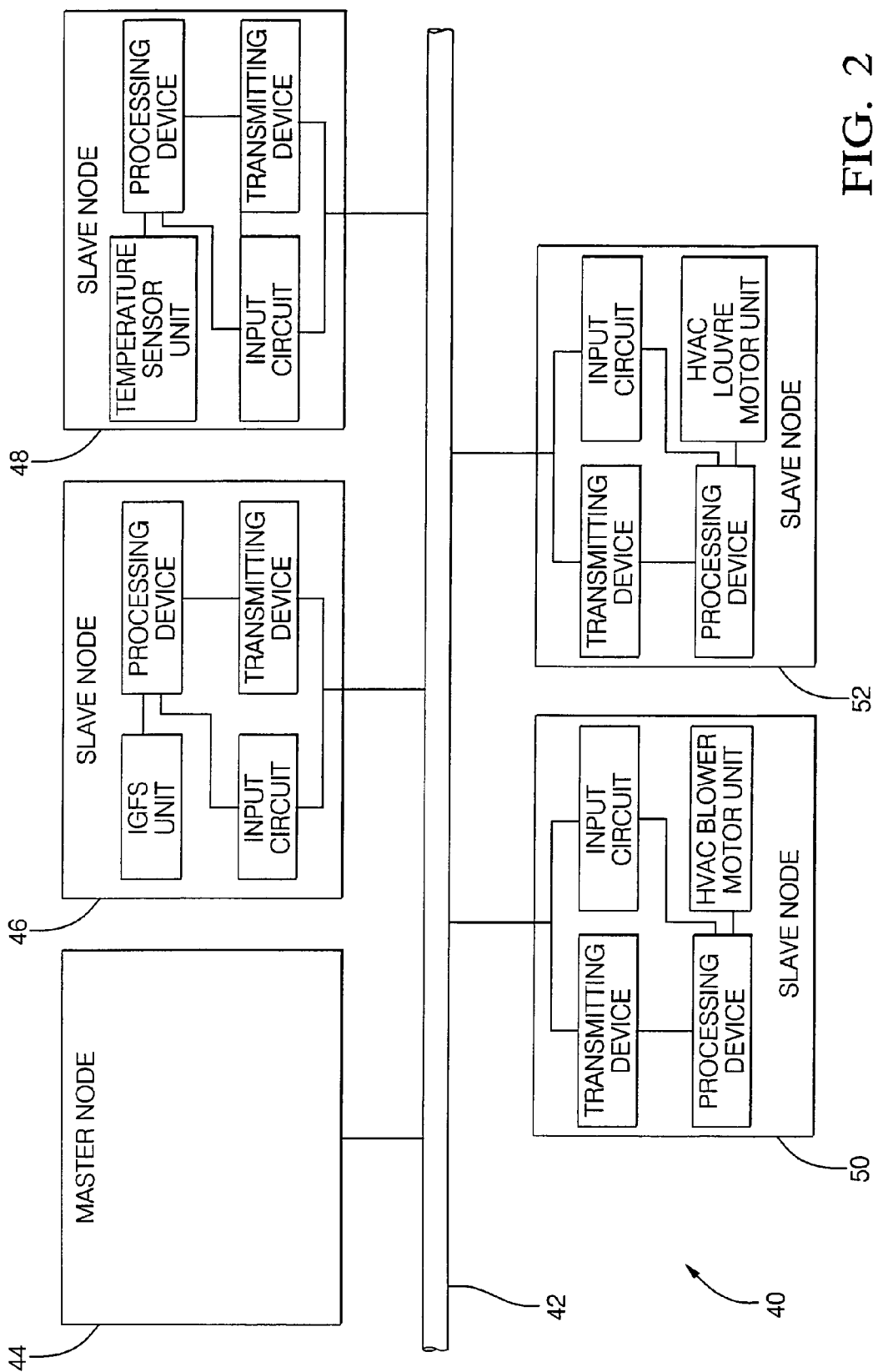
FIG. 2 is a schematic drawing of a portion of an embodiment of a LIN network, including a number of LIN slave nodes.

With reference to FIG. 2, there is shown a portion of a vehicle Heating Ventilation Air Conditioning (HVAC) LIN network 40 that is preferably, but not necessarily, designed for use with a larger Controller Area Network (CAN). This particular LIN network is simply being provided for exemplary purposes, as the slave nodes of the present invention could be used in any LIN network, including those used with a vehicle's seat, door or window controls, remote keyless entry (RKE), exterior and interior mirrors, steering wheel, sunroof, compass, lights, engine sensors, etc. Furthermore, the number of slave nodes in the LIN network could be greater than or less than that of the exemplary portion of network 40 shown here.

LIN network 40 is a single-wire serial communications network that generally includes a LIN bus 42, a master node 44, a glass fog sensor slave node 46, a temperature sensor slave node 48, an HVAC blower motor slave node 50 and a HVAC louver motor slave node 52. Although the various sensor and motor units of slave nodes 46-52 may differ from one another, the basic input circuit/processing device/transmitting device arrangements of the slave nodes are generally the same. Thus, the following explanation of glass fog sensor slave node 46 applies to slave nodes 48-52 as well.

Figure 1:
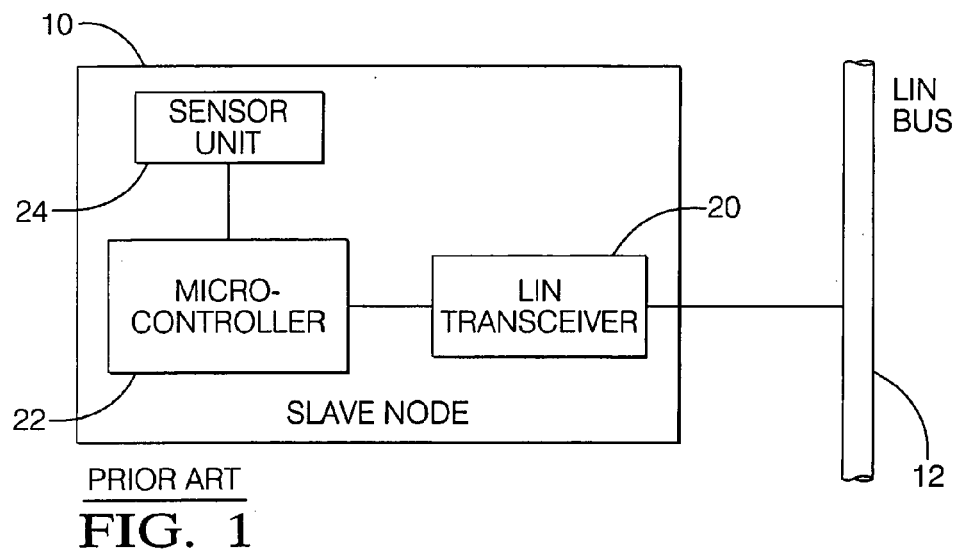
FIG. 1 is a schematic drawing of a prior art LIN slave node connected to a LIN bus.
Figure 3:
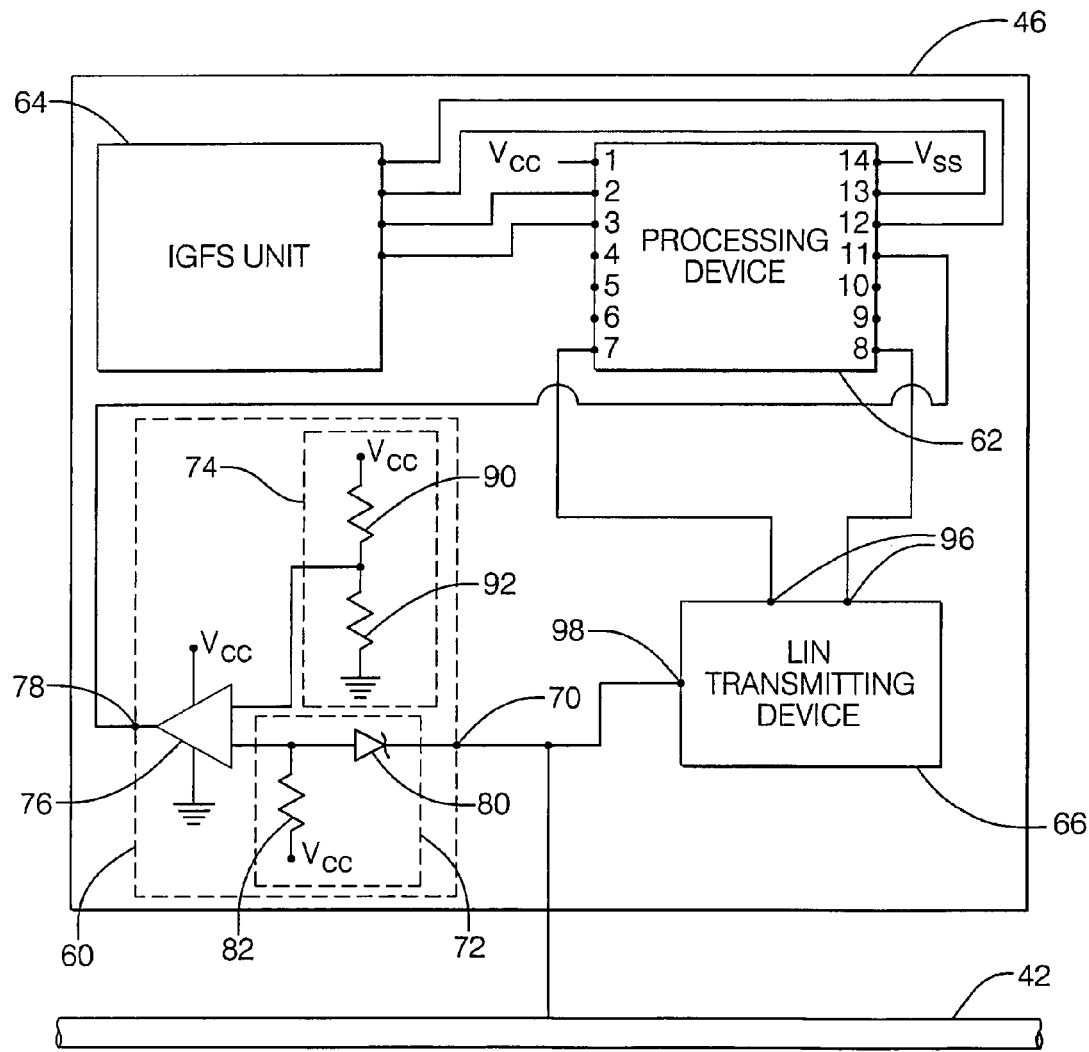
FIG. 3 is a more detailed schematic drawing of an embodiment of one of the LIN slave nodes of FIG. 2.

Turning now to FIG. 3, glass fog sensor slave node 46 is designed to receive messages from LIN bus 42 in a manner that conserves operating current, and preferably includes an input circuit 60, an electronic processing device 62, an IGFS unit 64 and a LIN transmitting device 66 all mounted on a single circuit board. Beginning with input circuit 60, this circuit is electronically coupled to LIN bus 42 and receives incoming messages from LIN network 40. The term "incoming message" is used herein to broadly include all messages, signals, commands and/or other electronic communications that arrive at a particular slave node via a LIN network; this includes, but is not limited to, LIN transmit and receive messages, as well as LIN message headers and message responses. Similarly, the term "outgoing message" is used herein to broadly include all messages, signals, commands and/or other electronic communications that are sent by a particular slave node via a LIN network; this includes, but is not limited to, LIN transmit messages and LIN message responses.

Input circuit 60 is generally the first slave node component to process an incoming message and, according to the particular embodiment shown here, includes a signal input 70, a level-shift circuit 72, a ground-shift circuit 74, a comparator 76, and a signal output 78. Level-shift circuit 72 shifts the voltage of the signals of the incoming messages on LIN bus 42 (typically in the range of 12v) to a lower voltage ($V_{cc}$) used by the slave node (typically about 3v-5v). The level-shift circuit 72 generally includes a diode 80, a resistor 82, a positive voltage node $V_{cc}$, and is coupled to signal input 70 and a non-inverting or positive input of comparator 76. Ground-shift circuit 74 compensates for fluctuations in the ground reference in order to improve the slave node's ability to accurately interpret messages from LIN bus 42. Ground-shift circuit 74 includes resistors 90 and 92 forming a voltage divider, a positive voltage node $V_{cc}$, and is coupled to the inverting or negative input of comparator 76. Comparator 76 or wave-shaping circuit is shown here in the form of an operational amplifier (op-amp), and performs wave-shaping functions on the signals of the incoming messages. Comparator 76 has positive and negative inputs coupled to level-shift and ground-shift circuits 72, 74, respectively, and an output coupled to signal output 78.

Electronic processing device 62 interprets incoming messages from LIN network 40 and, depending upon their nature and content, may also compile outgoing messages to be sent to the LIN network. More specifically, electronic processing device 62 determines if a message on LIN bus 42 pertains to slave node 46 (as opposed to another slave node) and if transmitting device 66 is required to respond to that message, before waking the transmitting device up. According to a preferred embodiment, electronic processing device 62 is a 14-pin microcontroller, such as Model # PIC16F688 sold by Microchip Technology Inc. However, this is only a preferred embodiment, as the term "electronic processing device" broadly includes all electronic devices capable of processing digital signals, including but not limited to, digital signal processors (DSPs), microprocessors, and microcontrollers. According to the specific embodiment shown in FIG. 3, pin 1 of the electronic processing device is connected to a positive voltage node $V_{cc}$, pins 2 and 3 are connected to a humidity sensor of IGFS unit 64, pins 7 and 8 are connected to transmitting device 66, pin 11 is connected to the signal output 78 of input circuit 60, pins 12 and 13 are connected to temperature sensors of IGFS unit 64, and pin 14 is connected to a ground node $V_{ss}$.

Integrated Glass Fog Sensor (IGFS) unit 64 includes temperature and humidity sensors for monitoring conditions associated with fog formation on a vehicle windshield, as more fully explained in U.S. Pat. No. 6,422,062, and is connected to electronic processing device 62. According to one embodiment, IGFS unit 64 includes a humidity sensor (not shown) for transmitting a humidity reading to pins 2 and 3 of the electronic processing device 62 via a pair of signal outputs, and a pair of temperature sensors (also not shown) for transmitting temperature readings to pins 12 and 13 of the electronic processing device.

Transmitting device 66 transmits outgoing messages to LIN network 40, and is coupled to electronic processing device 62 via signal inputs 96 and is coupled to LIN bus 42 via a signal output 98. According to a preferred embodiment, transmitting device 66 is a model # MC33661 LIN transceiver sold by Freescale Semiconductor Corporation, and can be operated in a low current sleep mode. Of course, this is only a preferred embodiment, as the term "transmitting device" broadly includes all components capable of transmitting messages onto a LIN network, including but not limited to, transmitters, transceivers, or another physical layer component. Unlike conventional LIN slave nodes where a LIN transceiver is a link in both the incoming and the outgoing message paths, transmitting device 66 is only part of the path of the outgoing message. Thus, transmitting device 66 is only awakened from its low current sleep mode when a message is being transmitted from slave node 46 to the LIN network 40, and not vice-versa. By removing transmitting device 66 from the incoming message path, the transmitting device avoids being unnecessarily awakened in those instances where a message is put on the LIN bus 42 but does not pertain to slave node 46, or when a message pertains to slave node 46 but requires no response. It should be noted, removal of transmitting device 66 from the incoming message path has certain ramifications. For instance, in conventional embodiments where a LIN transceiver is included in the incoming message path, it provides several functions including level-shifting, ground-shifting and wave shaping, to name a few. Those functions have been addressed by the present embodiment through input circuit 60.

In operation, slave node 46 reduces operating current, power consumption and/or operating temperature by removing transmitting device 66 from the incoming message path. This causes incoming messages to bypass the transmitting device and thus reduces the frequency with which the transmitting device is unnecessarily woken up out of its low current sleep mode. When master node 44 puts a message on LIN bus 42, that incoming message is received by all of the slave nodes in the LIN network 40, even though it generally only pertains to one of them. When the incoming message reaches slave node 46, it propagates through the incoming message path but does not travel through transmitting device 66, even though the transmitting device has a signal output 98 coupled to LIN bus 42. This is because transmitting device 66 is inactive and has not been enabled or turned on by processing device 62. Only in those circumstances where the incoming message pertains to that particular slave node and an outgoing message is required in response, is transmitting device 66 woken up out of its sleep mode. This process will now be explained in greater detail.

When the incoming message, which is a serially-transmitted message, arrives at slave node 46 from LIN bus 42 it enters input circuit 60 via signal input 70. Level-shifting is accomplished by level-shift circuit 72, which is the first circuit to process the incoming message and steps down the voltage of the signals of the incoming message so that they are compatible with the lower voltage used by the slave node. During periods of inactivity, master node 46 holds LIN bus 42 at a "high" value. Thus, there is no voltage drop across resistor 82 and the non-inverting input of comparator 76 is maintained at approximately $V_{cc}$. When the signal on LIN bus 42 is "low", then a voltage drop occurs across resistor 82 that changes the voltage of the non-inverting input of comparator 76 to some level less than $V_{cc}$. In this manner, level-shift circuit 72 steps down the higher voltage used on LIN bus 42 to the lower voltage ($V_{cc}$) used in the slave node.

Ground-shifting operations are performed by ground-shift circuit 74, which adjusts the reference voltage being applied to the inverting input of comparator 76 to offset shifts in the ground reference. For example, a 2v ground shift in LIN network 40 (voltage of signals of incoming message shifted from 0-12v to 2-14v) could be problematic for a low voltage slave node that only operates at 0-3v. Slave node 46, however, uses the voltage divider made from resistors 90 and 92 to create a reference signal of approximately 2.5v. The 2.0v ground shift can then be handled by comparator 76, so long as appropriate resistance values are chosen for resistors 82, 90 and 92 so that they accommodate the voltage drop across diode 80, as well as other considerations known to those skilled in the art.

Wave-shaping is provided by comparator 76, which compares the voltage of the signals of the incoming message to a ground-related reference voltage provided by ground-shift circuit 74, as just explained. This causes an incoming message having somewhat rounded signals to be squared off such that a more crisp, defined incoming message is provided to electronic processing device 62.

Once any needed level-shifting, ground-shifting and/or wave-shaping has occurred in input circuit 60, the message is sent to electronic processing device 62. The processing device decides whether or not the incoming message pertains to that particular slave node and whether or not an outgoing message is required in response. In order to identify the intended recipient of the message, electronic processing device 62 reads the contents of the incoming message. The protocol for LIN-based messages is standardized and is well known in the art, thus an exhaustive explanation has been omitted. Generally speaking, however, there are two different types of LIN messages: a transmit message and a receive message. In a transmit message, the master node provides the first three components of the message and an intended slave node provides the last two. Put differently, the slave node is expected to provide an outgoing message in response to the incoming message from the master node. In a receive message, on the other hand, the master node provides all five components of the message, as the intended slave node(s) is only expected to receive the message and is not expected to reply.

The first three components of the message are collectively referred to as the message header, while the last two components are collectively called the message response. The message header is sent by master node 44 and generally comprises a sync break (13 bits), a sync byte (0-1 bit), and an identifier (8 bits). The sync break identifies the start of a message frame, the sync byte is used by the slave node for clock synchronization, and the identifier includes a 6-bit message ID and a 2-bit parity field. The identifier includes information that instructs processing device 62 whether or not to respond to the incoming message or to perform a particular function. The message response can be provided by either the slave node or the master node, and generally includes a data field (1-8 bytes) and a checksum (8 bits). As its name suggests, the data field includes data or information. For example, if master node 44 were to query slave node 46 for readings pertaining to glass fog formation, then slave node 46 would use the data field to provide this information. The checksum is used for error checking and the like. For a more complete understanding of LIN networks and their protocol, please refer to the LIN protocol specification, which can be found at http://www.lin-subbus.org/.

In the case where either an incoming message does not pertain to slave node 46, or the incoming message pertains to slave node 46 but is a receive message (does not require a response from the slave node), then processing device 62 maintains LIN transmitting device 66 in a low current sleep mode. Generally, the only time that the transmitting device is woken up from its sleep mode is if a transmit message pertaining to that slave node has been received. In which case, the transmitting device is woken up, performs any level-shifting, ground-shifting, wave-shaping, or any other task required of it, transmits an outgoing message on LIN bus 42, and then returns to its sleep mode. Even though input circuit 60 and electronic processing device 62 must process each incoming message from LIN network 40, each of these devices draws much less current than does transmitting device 66. Moreover, either of these two devices could be operated in a low current sleep mode to further reduce the amount of operating current, power consumption and/or operating temperature.

According to another embodiment, one or more circuits and/or components of input circuit 60 are integrated into electronic processing device 62 such that the level-shifting, ground-shifting, and/or wave-shaping functions are performed by the processing device. For example, instead of comparator 76 constituting a separate op-amp, it could be provided as an on-board component of the electronic processing device. In such an arrangement, the level-shift and/or ground-shift circuits 72, 74 could still remain separate from the electronic processing device, or they too could be integrated therein. In the case of an integrated circuit and/or component, that item still remains a part of input circuit 60, but is integrated into electronic processing device 62 instead of being located at a separate location on the circuit board. Of course, other differences could exist between this integrated embodiment and the embodiment previously described. For instance, the processing device could provide its own reference voltage, as opposed to the reference voltage being provided by the specific voltage divider shown in ground-shift circuit 74. Other differences or substitutions could also exist and should be apparent to those skilled in the art.

According to yet another embodiment, heat sinks may be used on individual components to decrease their thermal impact. Furthermore, heat generation and dissipation may be characterized so that the electronic processing device actively compensates for increases given off by the slave node.

It will thus be apparent that there has been provided in accordance with the present invention a slave node and a LIN network having the same which achieve the aims and advantages specified herein. It will of course be understood that the foregoing description is of preferred exemplary embodiments of the invention and that the invention is not limited to the specific embodiments shown.

We claim:

1. A slave node for use in a Local Interconnect Network (LIN network), comprising:
    an input circuit for receiving an incoming message from the LIN network, said input circuit having a first signal input coupled to the LIN network and a first signal output;
    an electronic processing device for interpreting the incoming message and/or compiling an outgoing message, said electronic processing device having a second signal input coupled to said first signal output and a second signal output; and
    a transmitting device for transmitting the outgoing message to the LIN network, said transmitting device having a third signal input coupled to said second signal output, and a third signal output coupled to the LIN network;
    wherein said input circuit is separate from said transmitting device, such that said transmitting device can remain in an inactive sleep mode during reception of the incoming message and said electronic processing device wakes up said transmitting device from said inactive sleep mode when it is needed to transmit the outgoing message to the LIN network.

2. The slave node of claim 1, wherein said input circuit further includes at least one of the following: a level-shift circuit for shifting the voltage of the signals of the incoming message, a ground-shift circuit for compensating for fluctuations in a ground reference, and a comparator for waveshaping the signals of the incoming message.

3. The slave node of claim 2, wherein at least one of said level-shift circuit, said ground-shift circuit, or said comparator is integrated into said electronic processing device.

4. The slave node of claim 1, wherein said input circuit further includes a level-shift circuit for shifting the voltage of the signals of the incoming message, a ground-shift circuit for compensating for fluctuations in a ground reference, and a comparator for waveshaping the signals of the incoming message.

5. The slave node of claim 4, wherein at least one of said level-shift circuit, said ground-shift circuit and said comparator is integrated into said electronic processing device.

6. The slave node of claim 1, wherein said transmitting device inactivity is due to said transmitting device being operated in a sleep mode, and said transmitting device is only woken up from said sleep mode when it is transmitting the outgoing message.

7. The slave node of claim 1, wherein said electronic processing device is a digital microcontroller.

8. The slave node of claim 1, wherein said slave node is a glass fog sensor slave node used in conjunction with a vehicle windshield, and further includes an Integrated Glass Fog Sensor (IGFS) unit coupled to said electronic processing device.

9. The LIN network having a LIN bus, a master node, and said slave node of claim 1, wherein said master and slave nodes are coupled to each other via said LIN bus.

10. A slave node for use in a Local Interconnect Network (LIN network), comprising:
    a level-shift circuit for shifting the voltage of the signals of an incoming message from the LIN network;
    a ground-shift circuit for compensating for fluctuations in a ground signal;
    a wave-shaping circuit for shaping the signals of the incoming message;
    an electronic processing device for interpreting the incoming message; and
    a transmitting device for transmitting an outgoing message to the LIN network, said transmitting device can be maintained in a sleep mode and is coupled to the LIN network;
    wherein at least one of said level-shift, ground-shift and wave-shaping circuits is integrated into said electronic processing device and said electronic processing device wakes up said transmitting device when it is needed to transmit the outgoing message to the LIN network.

11. The slave node of claim 10, wherein said transmitting device is only awakened from said sleep mode when it is transmitting the outgoing message to the LIN network.

12. The slave node of claim 10, wherein said electronic processing device is a digital microcontroller.

13. The slave node of claim 10, wherein said slave node is a glass fog sensor slave node used in conjunction with a vehicle windshield, and further includes an Integrated Glass Fog Sensor (IGFS) unit coupled to said electronic processing device.

14. The LIN network having a LIN bus, a master node, and said slave node of claim 10, wherein said master and slave nodes are coupled to each other via said LIN bus.

15. A Local Interconnect Network (LIN network), comprising:
    a LIN bus;
    a master node coupled to said LIN bus; and
    a slave node coupled to said LIN bus, said slave node comprising:
    a level-shift circuit for shifting the voltage of the signals of an incoming message from said LIN bus;
    a ground-shift circuit for compensating for fluctuations in a ground reference;
    a comparator having a first input terminal coupled to said level-shift circuit and a second input terminal coupled to said ground-shift circuit;
    an electronic processing device for interpreting the incoming message; and
    a transmitting device for transmitting an outgoing message to the LIN network, said transmitting device is usually maintained in a sleep mode and is coupled to the LIN network;
    wherein said electronic processing device interprets the incoming message and only wakes up said transmitting device when it is needed to transmit the outgoing message.

* * * * *